Feb. 8, 1966 S. C. LOCKHART 3,233,946
ANTI-SKID SYSTEM AND CONTROL INCLUDING PROXIMITY COIL
ACCELERATION AND DECELERATION DETECTOR
Filed June 7, 1962

INVENTOR.
STANFORD C. LOCKHART
BY
J. B. Holden
ATTORNEY

United States Patent Office 3,233,946
Patented Feb. 8, 1966

3,233,946
ANTI-SKID SYSTEM AND CONTROL INCLUDING PROXIMITY COIL ACCELERATION AND DECELERATION DETECTOR
Stanford C. Lockhart, Akron, Ohio, assignor to The Goodyear Tire & Rubber Company, Akron, Ohio, a corporation of Ohio
Filed June 7, 1962, Ser. No. 200,633
9 Claims. (Cl. 303—21)

The present invention relates to anti-skid means and control systems, and particularly to one including a proximity coil acceleration and deceleration detector means therein.

Heretofore there have been various types of anti-skid systems proposed for use with vehicles, especially for use on aircraft wheels to permit maximum braking efficiencies within safe operating limits and stresses for the aircraft support means and tires. While these various types of anti-skid systems proposed heretofore have been quite successful and work well, it is always desirable to simplify such systems further to make them more dependable, or durable, and/or to improve the sensitivity or sturdiness thereof.

It thus is the general object of the present invention to provide an anti-skid system that is characterized by its adaptability for use with automotive and other vehicles and that is adaptable to be applied to old as well as new equipment, and which skid detector means is a relatively low cost, sturdy apparatus.

Another object of the invention is to use a proximity coil in anti-skid apparatus and systems for detecting wheel speed acceleration and deceleration and for using such accelerations and decelerations for anti-skid control, or warning action and wherein no mechanical or electrical contact or connection is needed to the rotating wheel.

Another object of the invention is to provide an anti-skid control system particularly adapted to be mounted on existing vehicular equipment with minimum changes thereto, to provide an anti-skid control system that has a high electrical output, and to provide a system of the type described that is rugged and stable, and which is relatively inexpensive.

Further objects of the invention are to provide an anti-skid control system where an oscillating circuit of a proximity coil and a condenser connects to a transistor that also has D.C. pulsating voltage supplied thereto when the magnetic field of the proximity coil is changed by relative movement of a diamagnetic or paramagnetic metal member to the proximity coil in the wheel unit to indicate the wheel speed, and to filter, amplify and rectify the output of the oscillating transistor circuit to provide control functions, for example, for an electrically operated control valve operatively connecting to the hydraulic fluid braking system for regulating the pressure therein dependent upon the rate of voltage change transmitted thereto and proportionate to the actuation of the proximity coil.

The foregoing and other objects and advantages of the present invention will be made more apparent as the specification proceeds.

Reference now is directed to the accompanying drawings where one currently preferred embodiment of the principles of the invention is shown in detail and where:

When referring to corresponding members shown in the drawings and referred to in the specification, corresponding numerals are used to facilitate comparison therebetween.

Figure 1:
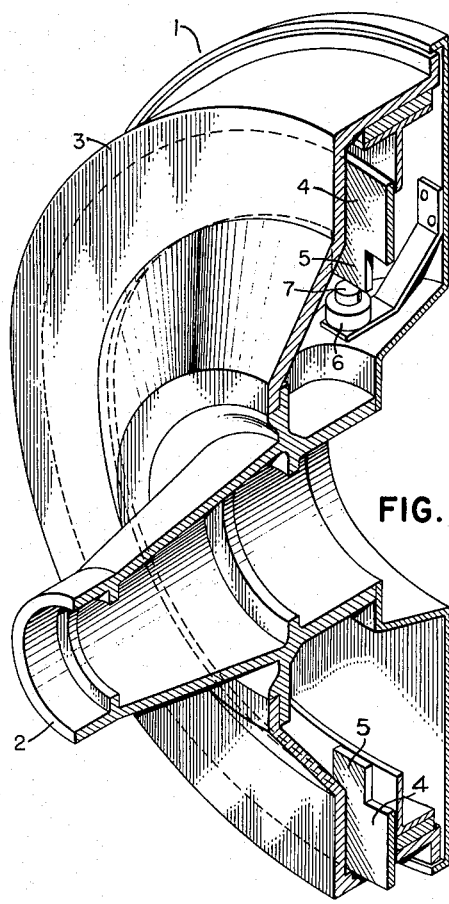
FIG. 1 is a fragmentary perspective view, partially broken away and shown in section, of a wheel with a sensing device of the invention associated therewith.
Figure 2:
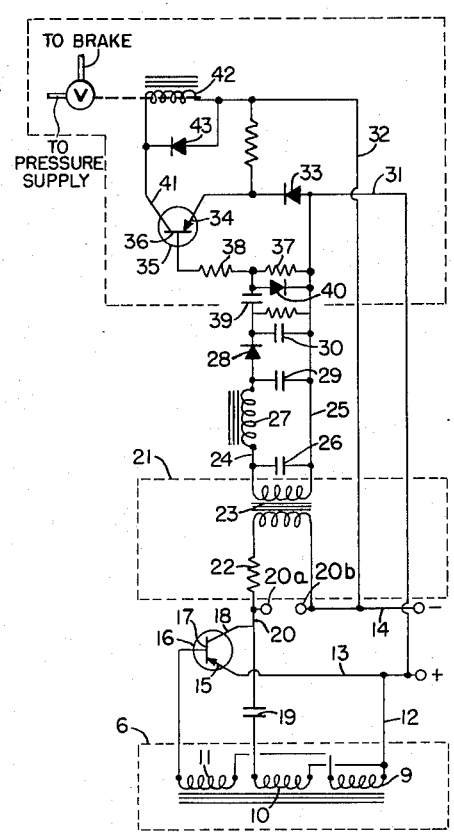
FIG. 2 is a typical circuit diagram of the anti-skid control action using the apparatus of FIG. 1.

This invention, in general, relates to deceleration detector apparatus comprising a proximity coil means positioned adjacent said wheel and having several separate coils therein, means for actuating said proximity coil means operatively carried by the wheel to actuate said proximity coil means in proportion to the wheel speed, a transistor, means forming an oscillator circuit connected to the collector of said transistor, a D.C. power supply connected to said proximity coil means and said transistor, and output means connected to the collector of said transistor to indicate wheel speed by the pulses of current provided.

Attention now is particularly directed to the details of the structure shown in the drawings, and a wheel assembly having a proximity coil of the invention associated therewith is indicated as a whole by the numeral 1. This wheel assembly 1 includes a positioning hub 2 that is suitably journalled on a carrier axle by conventional means (not shown). The hub 2 carries a brake or wheel housing 3 thereon secured thereto in a conventional manner, while a disc or ring 4 of diamagnetic metal, such as aluminum, brass, stainless steel or the like, is operatively secured to the wheel housing 3 on the inner surface thereof. By interchanging the ends of the poles on the coil 6, the ring 4 can be made of paramagnetic metal, such as iron. Such disc 4 has a pair, for example, or more pole pieces 5 extending therefrom to be moved with rotation of the hub 2 on its support means into and through the magnetic field of a proximity coil 6. The proximity coil 6 has a center core or pole 7 and is secured to a brake housing 8, or equivalent stationary member affixed to the aircraft support means, vehicle frame, or the like.

Electrical circuit and energization means connect to the proximity coil 6 whereby the magnetic field and currents in the proximity coil 6 are varied as the pole pieces 5 on the ring 4 are rotated thereacross, or thereadjacent. Hence, the circuits connected to the proximity coil will be varied dependent upon the rate of rotation of the wheel carried by the hub 2. These circuit means will be described hereinafter in more detail.

With reference to the details shown in the electrical circuit control means of the invention, the proximity coil 6 preferably comprises a plurality of coils 9, 10 and 11. The coils 9 and 11 are connected in series with each other and to a power supply lead 12 which in turn connects to the positive lead 13 of a D.C., for example 12 volts, power supply source provided by leads 13 and 14. The positive power supply lead 13 also connects to an emitter 15 of a transistor 16. The coils 9 and 11 are connected to the base 17 of the transistor 16, while the collector 18 of the transistor is connected through a condenser 19 to the output from the coil 10 of the proximity coil or unit. The coils 9 and 11 are so arranged and connected that one is negatively wound and the other is positively wound whereby the outputs therefrom normally cancel each other, whereas the coil 10 and condenser 19 are likewise provided of such relative inductance and capacitance, respectively, as to form an oscillator circuit, for example, at 5,000 cycles. In the absence of any metal in close proximity to the exposed face of the core 7 of the proximity coil, this circuit formed through the transistor 16 is balanced and no output exists. By the presence of the pole pieces 5 adjacent the core 7 of the proximity coil 6, the magnetic coupling between certain of the inductance coils, such as coils 9 and 10, is no longer in balance and this causes a pulsating D.C. current to be produced in the circuit.

The oscillation and D.C. pulses in the circuit of the proximity coil 6 and transistor 16 appear across the lead 14 and a lead 20 that operatively connects to the collector 18 of the transistor. Hence such high frequency alternating current is superimposed upon the D.C. component current flowing through these members. This superimposing produces a substantially square wave in the D.C. current which is an indication of the speed of wheel rotation. In order to utilize the square wave in the D.C. current as an indication of wheel rotation without further amplification or rectification a pair of take off terminals 20a and 20b may be provided. However, usually the substantially square wave produced in the D.C. current is transformed into a series of spiked waves composed of the high frequency portions of the square wave by means of a mutual inductance differentiator indicated as a whole by the numeral 21. This inductance differentiator 21 includes a resistance 22 connected to the lead 20 and a mutual inductance transformer 23 that also connects to the power supply lead 14. The transformer 23 thus also serves as an isolator between the input and output sections of the control circuit, and can function as a step-up transformer for the energy supplied thereto.

Rectifier and filter means are connected to the output leads 24 and 25 of the secondary of the transformer 23. More specifically, a condenser 26 connects across these leads 24 and 25 to attenuate the current and filter out the A.C. resonant frequency component of the current to leave the D.C. component that has been differentiated. Such differentiated D.C. current flows through a choke coil 27 and a suitable rectifier, such as a diode 28, that has condensers 29 and 30 connected across the leads 24 and 25 immediately adjacent thereto so that the output present after the diode 28 will comprise intermittent D.C. voltage pulses corresponding to the input signal frequency to measure the speed of rotation of the wheel.

The rectifier and filter network clips and smooths the spiked wave output of the D.C. voltage from the oscillator-transistor circuit, varying with the frequency, as produced by the proximity coil actuation and transmitted through the mutual inductance differentiator 21.

Substantially conventional switching section and control means are provided to actuate, or control the anti-skid control means in any desired manner by use of the output of leads 24 and 25 for a switching and control action, as now described in detail. The usual operation of the switching and control action is to use an R.C. circuit comprising a condenser 39, resistances 37 and 38, and diode 40, which puts out only a small electrical discharge into a transistor 35 when wheel rotation is normal, but which puts out a large electrical discharge as capacitor 39 discharges rapidly because of electrical unbalance in the circuit when wheel rotation is jerky, slowed perceptibly, or stopped to indicate an approaching skid condition or an actual skid condition. Thus additional leads 31 and 32 from the power supply leads 13, 14 are provided to effect positive current flow through a diode 33 connected in the lead 31 and which in turn connects to an emitter 34 of a transistor 35 to provide a forward bias on such emitter. The base 36 of this transistor is biased through resistances 37 and 38 that connect back to the power supply lead 31 so that the base 36 is negative with respect to the emitter 34 all as determined by the power loss in the resistances 37 and 38. Energy is also transmitted to this base 36 to control current through the transistor 35 by the lead 24 that connects thereto through the condenser 39 whereby the frequency of actuation of the proximity coil and energy impulses therefrom will be transmitted to and amplified by the transistor 35 for control action in its circuit.

A circuit across the leads 24 and 25 is also provided by a rectifier diode 40 that connects therebetween. The diode 40 has less resistance than resistor 37 and allows the capacitor 39 to charge quickly to provide balance to the circuit during normal wheel rotation. However the diode 40 acts as a block to current flow when the wheel speed decreases to indicate a skid so the capacitor 39 discharges rapidly through the transistor 35.

The controlled output from the transistor 35 is transmitted through a collector 41 of the transistor 35 and flows to a solenoid control coil 42. The solenoid control coil 42 controls, or is operatively coupled to an electrically actuated valve connected in the hydraulic circuit of a braking system for controlling the valve opening and hence the power and energy supplied to the braking system to make it a function of the current supplied to the solenoid coil, all as is conventional in solenoid controlled valve means of this type. A rectifier 43 is connected across the coil 42 to smooth current impulse flow therethrough, and the negative power supply lead 32 likewise connects to the solenoid coil 42 to complete circuit action therethrough.

It should be seen that all the apparatus of the invention requires to be assembled to an existing wheel and axle unit, is to provide the diamagnetic ring 4 on the wheel housing 3, and to position a proximity coil or unit 6 on the housing 8, or equivalent stationary portion of the wheel assembly. The remainder of the components can be carried at any desired location on the vehicle and provide sturdy and accurate indicating action of the relative speed of the wheel and brake housing to indicate whether, for example, skidding conditions are being approached, or are existing in the circuit. Normally the control action provided by the solenoid coil 42 and the sensitivity of the system is such that it terminates or reduces braking action as skidding conditions are being approached whereby such reduction in braking forces will occur soon enough that skidding conditions can be avoided.

The brake pressure control valve associated with or controlled by the solenoid control coil 42 is of the type in which the output pressure is a function of the electrical control current in the valve operating circuit. With this valve, if the input fluid pressure supply is constant, the output pressure will decrease almost linearly as the input current increases, and when the input hydraulic pressure changes, the output pressure changes almost linearly in the same direction. When a tendency to skid appears, a sudden increase in current from a current supply and control circuit of the invention occurs which causes the pressure control valve to reduce the pressure supplied to the brake and thereby relieve the tendency to skid. When no control current, or a minimum current appears at the pressure control valve through the solenoid control means, the valve will not interfere with the normal operation of the brake application means, which usually would include a manually operated metering valve, that supplies pressure for brake actuation through the solenoid operated or controlled brake pressure control valve operated by the solenoid coil 42.

Figure 3:
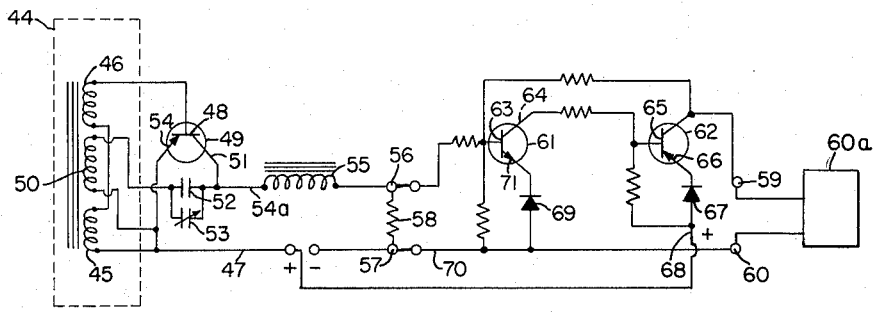
FIG. 3 is a circuit diagram of a modified type of control and control action of the invention.

FIG. 3 shows how the proximity coil detector circuit can be modified slightly and be used for other actions, as desired. Hence, a proximity coil and pole unit 44 is provided and it includes normally opposed and balanced coils 45 and 46 that connect from a D.C. positive power supply lead 47 to the base 48 on a transistor 49. Another coil 50 of the proximity unit 44 forms a portion of an oscillator circuit and connects to the power supply lead 47 and to the collector 51 of the transistor 48 through a condenser 52 that has a variable condenser 53 in parallel therewith. The emitter 54 for the transistor 49 also connects to the power supply lead 47 whereby current flow through the transistor 49 will not occur when the coils 45 and 46 are in balanced relation with each other, but when such balance is interrupted, as by a diamagnetic pole piece moving through the magnetic field of the proximity coil, then the coils 45 and 46 are sufficiently unbalanced as to bias the base 48 for making the transistor 49 conductive during such instances of unbalance, and to produce oscillation in the circuit set up by the proximity coil 50 and the condensers 52 and 53 associated therewith.

The output from the transistor-oscillator circuit is transmitted through a lead 54a to a filter, or choke coil 55 to smooth out some of the peaks in the D.C. current, and where the choke coil 55 will attenuate the high frequency oscillator carrier waves and leaves a square wave output available at terminals 56 and 57 which usually have a circuit limiting resistnce 58 connecting therebetween. Such terminals 56 and 57 can provide a voltage thereacross which is useful to indicate, as a torque, or drag meter, the extent of braking action being secured.

It is also within the scope of the present invention to take this voltage available at the terminals 56 and 57, when the resistance 58 is omitted, and to transmit such voltage through an amplifier and rectifier circuit to further output terminals 59 and 60 from which the product voltage can be used to provide a control for or to be a signal that antiskid action is needed, or that skidding conditions are being approached. Hence a visual, audible, or pounding member 60a can be controlled by the voltage at terminals 59 and 60. Such terminals have the voltage supplied to the terminals 56 and 57 amplified by suitable amplifier circuit means and supplied thereto for output action. In this instance, the amplifier circuit may comprise transistors 61 and 62 with the base 63 of the transistor 61 being connected to the terminal 56. The collector 64 of the transistor 61 in turn connects to the base 65 of the transistor 62 to control current flow therethrough by the bias on the base in relation to the bias provided on the emitter 66 of this transistor through a member, such as a rectifier diode 67, connecting to a suitable D.C. power supply lead 68.

Further control action is provided in this amplifier circuit by means of a zener diode 69 which connects to a lead 70 extending from the terminal 57 connecting to the emitter 71 for the transistor 61. An adjustable resistance 72 provides a regenerative feed back circuit adjustment. The control system is rugged and relatively inexpensive but yet can readily be secured to an existing vehicle and wheel structure so that it is believed that the objects of the invention have been achieved.

Usually the apparatus of the invention is used to measure deceleration, but it could be used to indicate acceleration, when desired.

While a certain representative embodiment and details have been shown for the purpose of illustrating the invention, it will be apparent to those skilled in this art that various changes and modifications may be made therein without departing from the spirit or scope of the invention.

What I claim is:

1. In combination with a wheel, fluid operated brake means for the wheel, means for creating braking pressures in the braking means and a solenoid operated control valve means connected to the fluid operated brake means to control braking pressures proportionately to the electrical current flowing therein, the elements of
   a proximity coil means consisting of a plurality of small coils,
   means for actuating said proximity coil means operatively carried by the wheel to actuate said proximity coil means in proportion to the wheel speed,
   a transistor,
   a capacitor connected in series with one of the coils of said proximity coil means and the collector of said transistor to form an oscillator circuit,
   a D.C. power supply connected to said proximity coil means and said transistor,
   a mutual inductance differentiator connected to the collector of said transistor, and
   amplifier and rectifier means connecting said mutual inductance differentiator to the solenoid operated control valve means to regulate braking action by the frequency and amplitude of actuation of said proximity coil means.

2. The combination in an anti-skid control system for a wheel of a proximity coil means positioned adjacent said wheel and having three separate coils therein,
   a D.C. power supply connected to said proximity coil means to energize the coils thereof,
   a pair of said coils being connected in opposed and balanced relation for no output therefrom under normal operating conditions,
   means for actuating said proximity coil means operatively carried by the wheel to unbalance said pair of said coils at a rate in proportion to the wheel speed,
   a capacitor connected in series with the third of said coils of said proximity coil means to form an oscillator circuit, and
   electrical R.C. circuit means connecting to said capacitor and to said pair of coils to provide an electrical output inversely proportional to the frequency of unbalance of said two coils, and
   means actuated by said electrical R.C. circuit means to provide anti-skid control for said wheel.

3. The combination with a wheel of an anti-skid control means comprising
   a proximity coil means positioned adjacent said wheel and having several separate coils therein,
   means for actuating said proximity coil means operatively carried by the wheel to actuate said proximity coil means in proportion to the wheel speed,
   a transistor,
   a capacitor connected in series with one of said coils of said proximity coil means and the collector of said transistor to form an oscillator circuit,
   a D.C. power supply connected to said proximity coil means and said transistor,
   a mutual inductance differentiator connected to the collector of said transistor, and
   amplifier and rectifier means connecting said mutual inductance differentiator to an output means to produce an electrical output signal inversely proportional to the frequency of actuation of said proximity means.

4. Apparatus for attachment to a wheel and axle assembly to provide an anti-skid system therefor, and comprising
   a proximity coil means adapted to be stationarily positioned adjacent said wheel and having three separate coils therein,
   a transistor,
   a D.C. power supply connected to said proximity coil means and to the emitter of said transistor,
   a pair of the coils of said proximity means being connected in opposed and balanced relation with an output lead therefrom connecting to the base of said transistor,
   a diamagnetic disc means for actuating said proximity coil means adapted to be operatively carried by the wheel to actuate said proximity coil means in proportion to the wheel speed,
   a capacitor connected in series with the third one of said coils of said proximity coil means and the collector of said transistor to form an oscillator circuit, and
   circuit means connecting to the output of said transistor to provide an electrical output signal inversely proportional to the frequency of actuation of said proximity means.

5. An anti-skid and brake action indicator for a rotatable wheel comprising
   a proximity coil means positioned adjacent a wheel and having several separate coils therein,
   means for actuating said proximity coil means operatively carried by the wheel and only magnetically coupled to said proximity coil means to actuate it in proportion to the wheel speed,
   a transistor, a capacitor means connected in series with one of said coils of said proximity coil means and the collector of said transistor to form an oscillator circuit, a D.C. power supply connected to said proximity coil means and said transistor, a pair of said coils being connected in opposed and balanced relation for no output therefrom except when actuated by said means, said pair of coils being connected to the base of said transistor, and a current limiting means connected to the collector of said transistor whereby the output from said current limiting means can be used to measure speed of said wheel.

6. Anti-skid and brake action indicator comprising a proximity coil means positioned adjacent a wheel and having several separate coils therein, means for actuating said proximity coil means operatively carried by the wheel and magnetically coupled to said proximity coil means to actuate it in proportion to the wheel speed, a transistor, an oscillator circuit means connected to said transistor, a D.C. power supply connected to said proximity coil means and said transistor, a pair of said coils being connected in opposed and balanced relation for no output therefrom except when actuated by said means, said pair of coils being connected to said transistor, and a current limiting means connected to the collector of said transistor whereby the output from said limiting means can be used to measure braking action and wheel speed.

7. A skid detection apparatus for a rotatable wheel comprising a means with at least two actuating coils therein connected in series but opposed and balanced relation, a D.C. power supply connected to said coils, magnetic means positioned on said wheel for rotary movement with relation to said means to change the balance of said coils and provide output signals proportional to the speed of said wheel, an oscillator circuit means, and a transistor connected to said power supply, oscillator circuit means and to said first-named means to produce an output when said coils are out of balance whereby such output can be used to indicate the speed of said wheel.

8. Anti-skid control apparatus including a proximity coil means adapted to be positioned adjacent a wheel and having several separate coils therein, means for actuating said proximity coil means adapted to be operatively carried by the wheel to actuate said proximity coil means in proportion to the wheel speed, a transistor, a capacitor connected in series with one of said coils of said proximity coil means and the collector of said transistor to form an oscillator circuit, a D.C. power supply connected to said proximity coil means and said transistor, a transformer means having a primary connected to the collector of said transistor, and amplifier and rectifier means connecting to the secondary of said transformer and to an output means to indicate the frequency of actuation of said proximity means.

9. In anti-skid system for a rotatable wheel the combination of a proximity coil means positioned adjacent said wheel, means to electrically energize said proximity coil means to produce a magnetic field therearound, actuator means operatively carried by said wheel and adapted to pass through the magnetic field of said proximity coil means to produce electrical pulses in proportion to the rotational speed of said wheel, circuit means adapted to produce an electrical output signal inversely proportional to the frequency of said electrical pulses, and control means responsive to the electrical output signal of said current means to provide anti-skid control for said wheel.

References Cited by the Examiner
UNITED STATES PATENTS
2,505,577   4/1950   Rich _____ 331—65 X EUGENE G. BOTZ, *Primary Examiner.*

Disclaimer 3,233,946.—*Stanford C. Lockhart*, Akron, Ohio. ANTI-SKID SYSTEM AND CONTROL INCLUDING PROXIMITY COIL ACCELERATION AND DECELERATION DETECTOR. Patent dated Feb. 8, 1966. Disclaimer filed July 6, 1970, by the assignee, *The Goodyear Tire & Rubber Company*.

Hereby enters this disclaimer to claim 9 of said patent.
[*Official Gazette October 6, 1970.*]